United States Patent
Cho et al.

(10) Patent No.: US 10,187,562 B2
(45) Date of Patent: *Jan. 22, 2019

(54) APPARATUS AND METHOD FOR CONTROLLING AUTO FOCUS FUNCTION IN ELECTRONIC DEVICE

(71) Applicant: Samsung Electronics Co., Ltd., Suwon-si, Gyeonggi-do (KR)

(72) Inventors: Sang-Heum Cho, Daejeon (KR); Gi-Ung Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

This patent is subject to a terminal disclaimer.

(21) Appl. No.: 14/965,259

(22) Filed: Dec. 10, 2015

(65) Prior Publication Data

US 2016/0100096 A1   Apr. 7, 2016

Related U.S. Application Data

(63) Continuation of application No. 13/849,152, filed on Mar. 22, 2013, now Pat. No. 9,250,498.

(30) Foreign Application Priority Data

Mar. 23, 2012 (KR) .................. 10-2012-0029968

(51) Int. Cl.
*H04N 5/232*  (2006.01)
*H04N 5/77*   (2006.01)
(Continued)

(52) U.S. Cl.
CPC ......... *H04N 5/23212* (2013.01); *G03B 13/36* (2013.01); *G06F 3/041* (2013.01); *H04N 5/772* (2013.01)

(58) Field of Classification Search
CPC .... H04N 5/23212; H04N 5/772; G06F 3/041; G03B 13/36
(Continued)

(56) References Cited

U.S. PATENT DOCUMENTS

2003/0174233 A1   9/2003  Onozawa
2004/0080660 A1   4/2004  Battles et al.
(Continued)

FOREIGN PATENT DOCUMENTS

JP    2003/262910 A    9/2003
KR    10-2005-0087795 A    8/2005

*Primary Examiner* — Shahbaz Nazrul
(74) *Attorney, Agent, or Firm* — Jefferson IP Law, LLP (57) ABSTRACT

An apparatus and a method for performing an Auto Focus (AF) function in an electronic device which does not perform the AF function while performing a camcorder function are provided. The apparatus includes a camera for receiving a photographing data, a camera processing unit for performing any one of a still picture acquisition function and an AF function, a recording processing unit for performing a function for recording the photographing data, a camera driver for operating the camera under control of the camera processing unit and the recording processing unit, and a processor for controlling the camera processing unit and the recording processing unit when detecting an AF request while photographing a moving picture to focus on the photographing data automatically and to record the focused photographing data.

20 Claims, 6 Drawing Sheets (51) Int. Cl.
*G06F 3/041* (2006.01)
*G03B 13/36* (2006.01)

(58) Field of Classification Search
USPC .................................................. 348/345–357
See application file for complete search history.

(56) References Cited

U.S. PATENT DOCUMENTS

| | | |
|---|---|---|
| 2004/0263674 A1 | 12/2004 | Koreki |
| 2010/0020221 A1 | 1/2010 | Tupman et al. |
| 2010/0141826 A1 | 6/2010 | Thorn |
| 2011/0061002 A1 | 3/2011 | Bethune et al. |
| 2011/0115945 A1 | 5/2011 | Takano et al. |
| 2011/0176795 A1* | 7/2011 | Won ........................ G02B 7/102 396/133 |
| 2012/0169593 A1* | 7/2012 | Mak ........................ G06F 3/0485 345/157 |
| 2012/0194689 A1* | 8/2012 | Kodama ............... H04N 5/2351 348/220.1 |
| 2012/0270596 A1* | 10/2012 | Los ..................... H04N 5/23212 455/556.1 |
| 2014/0009643 A1* | 1/2014 | Ito ........................... H04N 5/265 348/239 |
| 2014/0211080 A1* | 7/2014 | Itoh ........................ G02B 7/285 348/357 |

* cited by examiner

APPARATUS AND METHOD FOR CONTROLLING AUTO FOCUS FUNCTION IN ELECTRONIC DEVICE

CROSS-REFERENCE TO RELATED APPLICATION(S)

This application is a continuation application of prior application Ser. No. 13/849,152, filed on Mar. 22, 2013, which claimed the benefit under 35 U.S.C. § 119(a) of a Korean patent application filed on Mar. 23, 2012 in the Korean Intellectual Property Office and assigned Serial No. 10-2012-0029968, the entire disclosure of which is hereby incorporated by reference.

BACKGROUND OF THE INVENTION

1. Field of the Invention

The present invention relates to an electronic device for providing a camera function. More particularly, the present invention relates to an apparatus and method for performing an Auto Focus (AF) function in an electronic device.

2. Description of the Related Art

Electronic devices such as portable terminals have become necessities of modern life for people of all ages. Thus, service providers and terminal manufacturers are competitively developing differentiated products (or services).

For example, portable terminals have developed into a multimedia device capable of providing various services such as a phonebook service, a game service, a short message service, an e-mail service, a wake-up call service, an MPEG-1 Audio Layer 3 (MP3) service, a scheduling service, a multimedia message service, a wireless Internet service, and the like.

Recently, the portable terminals on which a camera is mounted have come into wide use such that users of the portable terminals easily photograph a variety of images anytime or anywhere. Also, because the number of supporting pixels of the camera mounted on the portable terminals is increased, the camera mounted on the portable terminals may play a role in performing a digital camera function.

In addition, portable terminals have recently been configured to provide an AF function which quickly focuses a point a user wants. When the portable terminals supports a touch screen, the user may use the AF function for a desired point through a touch input.

The portable terminals may also provide a camcorder function for recording and storing a moving picture in addition to a camera function for photographing a shape of an object. However, there is a problem in that the user may not use the AF function while performing the camcorder function. This is because a recording module for providing the camcorder function of each of the portable terminals controls a camera driver independently and a camera module for providing the camera function may not be operated. In other words, this means that the recording module occupies the camera driver when performing the camcorder function and another module (e.g., a camera module) may not control the camera driver.

Therefore, in order to solve the above-described problem, an apparatus and method for providing the AF function when performing the camcorder function in an electronic device is needed.

The above is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for improving performance of a recording function in an electronic device.

Another aspect of the present invention is to provide an apparatus and method for performing an Auto Focus (AF) function during a recording process in an electronic device.

Another aspect of the present invention is to provide an apparatus and method for authorizing a recording module to access a camera module when performing a recording process in an electronic device.

In accordance with an aspect of the present invention, an apparatus for controlling an AF function in an electronic device is provided. The apparatus includes a camera for receiving a photographing data, a camera processing unit for performing any one of a still picture acquisition function and an AF function, a recording processing unit for performing a function for recording the photographing data, a camera driver for operating the camera under control of the camera processing unit and the recording processing unit, and a processor for controlling the camera processing unit and the recording processing unit when detecting an AF request while photographing a moving picture to focus on the photographing data automatically and to record the focused photographing data.

In accordance with another aspect of the present invention, an electronic device is provided. The electronic device includes one or more processors, a memory, and one or more modules, each of which is stored in the memory and is configured to be executed by the one or more processors, wherein the one or modules include a camera module for performing one of a still picture acquisition function and an AF function and a recording module for performing a function for recording a photographing data and wherein each of the one or modules includes an instruction for controlling the recording module and the camera module when detecting an AF request while photographing a moving picture to automatically focus on the photographing data and to record the focused photographing data.

In accordance with another aspect of the present invention, a method of controlling an AF function in an electronic device is provided. The method includes performing one of a still picture acquisition function and an AF function using a camera module, recording a photographing data using a recording module, and controlling the recording module and the camera module when detecting an AF request while photographing a moving picture, automatically focusing on a photographing data, and recording the focused photographing data.

In accordance with another aspect of the present invention, a non-transient computer readable medium which stores one or more programs includes instructions for allowing an electronic device to perform any one of a still picture acquisition function and an AF function using a camera module, record a photographing data using a recording module, and control the recording module and the camera module when detecting an AF request while photographing a moving picture to focus on the photographing data record the focused photographing data, when the instructions are executed by the electronic device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to an apparatus and method for performing an Auto Focus (AF) function in an electronic device which does not perform the AF function while performing a camcorder function.

Hereinafter, a description will be given for an apparatus and method for performing an AF function during a recording process in an electronic device according to an exemplary embodiment of the present invention. Also, hereinafter, a description will be given later for an electronic device. Herein, the electronic device has a camera. Also, the electronic device may drive a camera module used when photographing a still picture and a recording module used when photographing a moving picture, respectively and independently, and may perform an AF function only when photographing the still picture.

Figure 1:
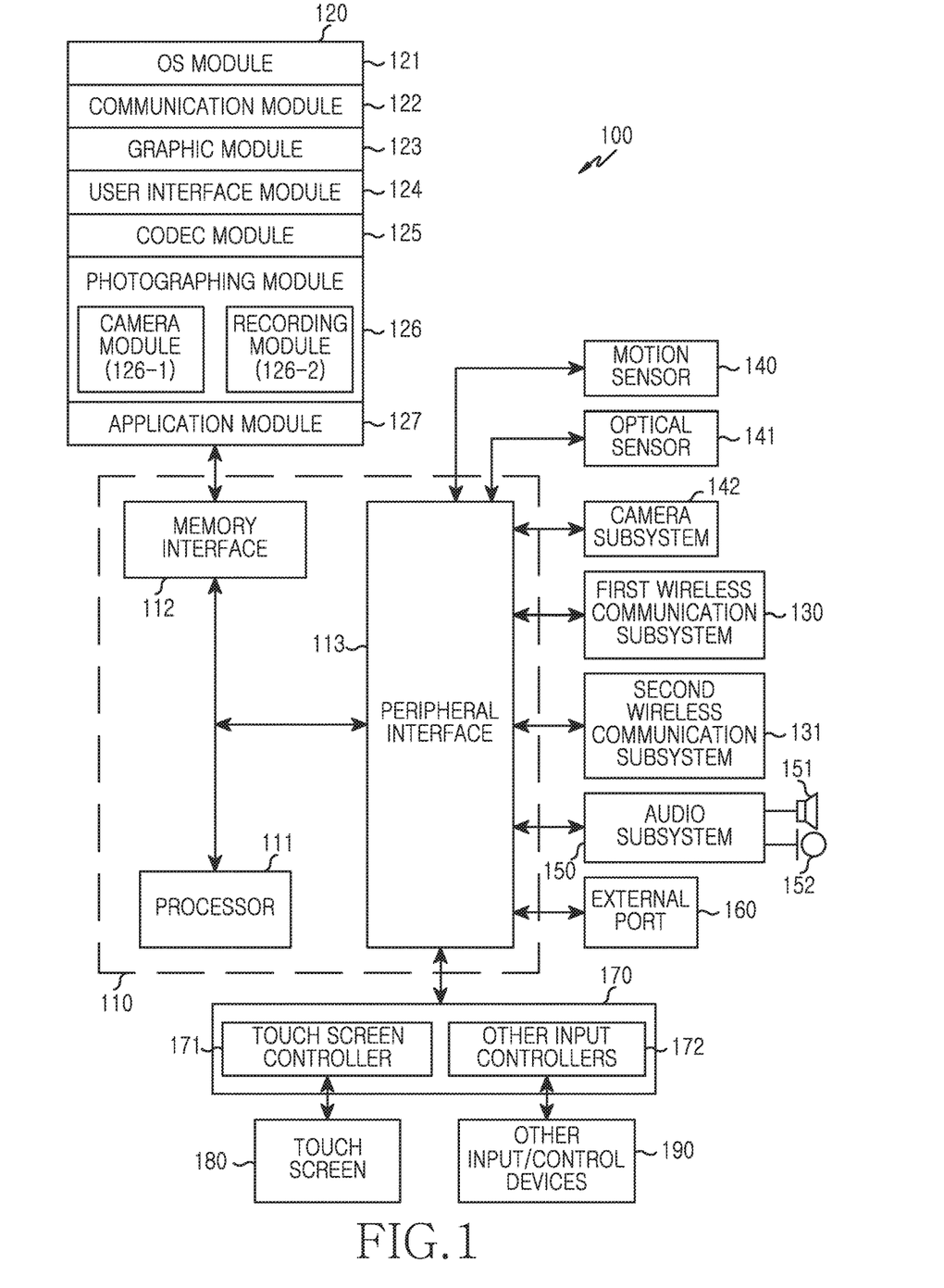
FIG. 1 is a block diagram illustrating configuration of an electronic device according to an exemplary embodiment of the present invention.

FIG. 1 is a block diagram illustrating configuration of an electronic device according to an exemplary embodiment of the present invention.

Referring to FIG. 1, the electronic device denoted by 100 may be a portable electronic device. For example, the electronic device 100 may be a portable terminal, a mobile phone, a media player, a tablet computer, a handheld computer, or a Personal Digital Assistant (PDA). Also, the electronic device 100 may be a certain portable electronic device including a device in which two or more functions are combined among these devices.

The electronic device 100 includes a processor unit 110, a memory 120, a first wireless communication subsystem 130, a second wireless communication subsystem 131, a motion sensor 140, an optical sensor 141, a camera subsystem 142, an audio subsystem 150, a speaker 151, a microphone 152, an external port 160, an Input/Output (I/O) system 170, a touch screen 180, and other input/control devices 190. The memory 120 and the external port 160 may be a plurality of memories and external ports, respectively.

The processor unit 110 may include one or more processors 111, a memory interface 112, and a peripheral interface 113. In some cases, the processor unit 110 is referred to as a processor. The one or more processors 111, the memory interface 112, and/or the peripheral interface 113 may be separately configured or may be integrated in one or more Integrated Circuits (ICs).

The one or more processors 111 executes several software programs and performs several functions for the electronic device 100. Also, the one or more processors 111 performs process and control for voice communication and data communication. In addition to this normal function, the one or more processors 111 executes a specific software module (e.g., command set) stored in the memory 120 and plays a role in performing several specific functions corresponding to the software module. In other words, the one or more processors 111 interworks with the software modules stored in the memory 120 and performs the method according to an exemplary embodiment of the present invention.

In accordance with an exemplary embodiment of the present invention, the one or more processors 111 controls a photographing module 126 stored in the memory 120 to control an operation of a camera. When the one or more processors 111 performs an AF function during a recording process through a recording module 126-2, the one or more processors 111 acquires an image data which is automatically focused through a camera module 126-1.

In accordance with an exemplary embodiment of the present invention, the one or more processors 111 includes a camera processing unit for acquiring a still picture and a recording processing unit. The one or more processors 111 controls the camera processing unit and the recording processing unit, respectively to control an operation of a camera. When the one or more processors 111 performs an AF function during a recording process through the recording processing unit, the one or more processors 111 acquires an image data which is automatically focused through the camera processing unit.

A variety of components of the electronic device 100 may be coupled by one or more communication buses (not written in reference numbers) or stream lines (not written in reference numbers).

The external port 160 is used to connect the electronic device 100 to another electronic device directly or connect the electronic device 100 to another electronic device indirectly through a network (e.g., the Internet, an intranet, a wireless Local Area Network (LAN), and the like). For example, the external port 160 may correspond to any one of a Universal Serial Bus (USB) port, a firewire port, and the like.

The motion sensor 140 and the optical sensor 141 may connect to the peripheral interface 113 and may perform several functions. For example, the motion sensor 140 and the optical sensor 141 may connect to the peripheral interface 113, may detect motion of the electronic device 100, and may detect light from the outside, respectively. Furthermore, a position measurement system and other sensors such as a temperature sensor, a bio-sensor, and the like may connect to the peripheral interface 113 and may perform related functions.

The camera subsystem 142 may connect to an imaging device such as a Charge Coupled Device (CCD) or a Complementary Metal-Oxide Semiconductor (CMOS) device and may perform a camera function such as a photo and video clip recording function.

The electronic device 100 performs a communication function through the first and second wireless communication subsystems 130 and 131. Each of the first and second wireless communication subsystems 130 and 131 may include a radio frequency receiver and transceiver and/or a beam (e.g., infrared ray) receiver and transceiver. The first communication subsystem 130 and the second communication subsystem 131 may be classified according to a communication network through which the electronic device 100 communicates. For example, the communication network may be, but is not limited to, a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a Wireless Fidelity (Wi-Fi) network, a WiMax network, and/or a Bluetooth network, and the like. Each of the first and second communication subsystems 130 and 131 may include a communication subsystem designed to be operated through the communication network.

The audio subsystem 150 may connect to the speaker 151 and the microphone 152 and may be responsible for inputting and outputting an audio stream, such as a voice recognition function, a voice copy function, a digital recording function, and a phone call function. For example, the audio subsystem 150 communicates with a user through the speaker 151 and the microphone 152. The audio subsystem 150 receives a data stream through the peripheral interface 113 of the processor unit 110 and converts the received data stream into an electric stream. The converted electric stream is transmitted to the speaker 151. The speaker 151 converts the electric stream into a sound wave to which the user may listen and outputs the converted sound wave. The microphone 152 converts a sound wave transmitted from the user or other sound sources into an electric stream. The audio subsystem 150 receives the converted electric stream from the microphone 152. The audio subsystem 150 converts the received electric stream into an audio data stream and transmits the converted audio data stream to the peripheral interface 113. The audio subsystem 150 may include an attachable and detachable earphone, headphone, or headset.

The I/O system 170 may include a touch screen controller 171 and/or other input controllers 172. The touch screen controller 171 may be coupled to the touch screen 180. The touch screen 180 and the touch screen controller 171 may detect, but is not limited to, contact and motion or stopping of contact or motion using not only capacitive, resistive, infrared ray, and surface acoustic wave technologies for determining one or more contact points but also a certain multi-touch detecting technology including other proximity sensor arrangement or other elements. The other input controllers 172 may be coupled to the other input/control devices 190. The other input/control devices 190 may include one or more up/down buttons for performing volume control.

The touch screen 180 provides an input/output interface between the electronic device 100 and the user. For example, the touch screen 180 transmits touch input of the user to the electronic device 100. Also, the touch screen 180 is a medium for displaying output from the electronic device 100 to the user. For example, the touch screen 180 displays visual output to the user. This visual output may have a text type, a graphic type, a video type, and a combination thereof.

The touch screen 180 may be any one of several displays. For example, the touch screen 180 may be, but is not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), a Flexible LED (FLED), and the like.

The memory 120 may be coupled to the memory interface 112. The memory 120 may include a high-speed Random Access Memory (RAM) such as one or more magnetic storages, a non-volatile memory, one or more optical storages, and/or a flash memory (e.g., a NAND flash memory or a NOR flash memory).

The memory 120 stores software components. The software components include an Operating System (OS) module 121, a communication module 122, a graphic module 123, a user interface module 124, a CODEC module 125, a photographing module 126, one or more application modules 127, and the like. Also, the modules which are the software components may be expressed in a set of instructions. Accordingly, the modules are expressed in an instruction set. Also, the modules are expressed in programs.

One or more modules including instructions for performing several methods of exemplary embodiments of the present invention may be stored in the memory 120.

The OS module 121 includes several software components for controlling a general system operation. For example, control of this general system operation means memory management and control, storage hardware (device) control and management, power control and management, and the like. This OS module 121 also performs a function for smoothly communicating between several hardware (devices) and software components (modules).

The communication module 122 may communicate with other electronic devices such as a computer, a server, and/or a portable terminal through the first and second wireless communication subsystems 130 and 131 or the external port 160.

The graphic module 123 includes several software components for providing and displaying graphics on the touch screen 180. The term "graphics" means that texts, web pages, icons, digital images, videos, animations, and the like are included.

The user interface module 124 includes several software components related to a user interface. The user interface module 124 includes contents about whether a state of a user interface is changed to any state, whether a state of a user interface is changed in any condition, and the like.

The CODEC module 125 may include software components related to encoding and decoding of video files. The CODEC module 125 may include a video stream module such as an MPEG module and/or an H204 module. Also, the CODEC module 125 may include a CODEC module for several audio files such as AAA files, AMR files, and WMA files.

The photographing module 126 includes cameral-related software components capable of performing camera-related processes and functions. The photographing module 126 includes the camera module 126-1 for acquiring still pictures and the recording module 126-2 for acquiring moving pictures. The camera module 126-1 is a module for communicating with an application for providing a camera function and a camera driver. In general, the camera module 126-1 controls the camera driver and operates a camera. In addition, the camera module 126-1 may move a camera lens according to distance of an object using the camera driver and may focus on the object automatically. In addition, the camera module 126-1 may provide a data which is focused on the object to the recording module 126-2.

The recording module 126-2 is a module for communicating with an application for providing a camcorder function and a camera driver. In general, the recording module 126-2 controls the camera driver and operates a camera. In addition, the recording module 126-2 provides an image data input through the camera to the application and outputs the image data on a screen. The recording module 126-2 may record and store an image data input through the camera, may provide the stored image data to the application, and may output the image data on a screen. In addition, the recording module 126-2 may communicate with the camera module 126-1 during a recording process, may acquire a data to which an AF function is applied, and may record and store the acquired data.

The photographing module 126 also includes an instruction set corresponding to the method of an exemplary embodiment of the present invention. The instruction set includes contents for authorizing the recording module 126-2 to access the camera module 126-1, when performing an AF function while a moving picture function is performed.

The application module 127 includes a browser function, an email function, an instant message function, a word processing function, a keyboard emulation function, an address book function, a touch list function, a widget function, a Digital Right Management (DRM) function, a voice recognition function, a voice copy function, a position determining function, a location based service function, and the like. The memory 120 may include additional modules (instructions) in addition to the above-described modules. Alternatively, if necessary, the memory 120 may not use some modules (instructions).

A variety of functions of the electronic device 100, which are described above or to be described later, may be executed by one or more streaming processing, hardware including an Application Specific Integrated Circuit (ASIC), software, and/or combination thereof.

Figure 2:
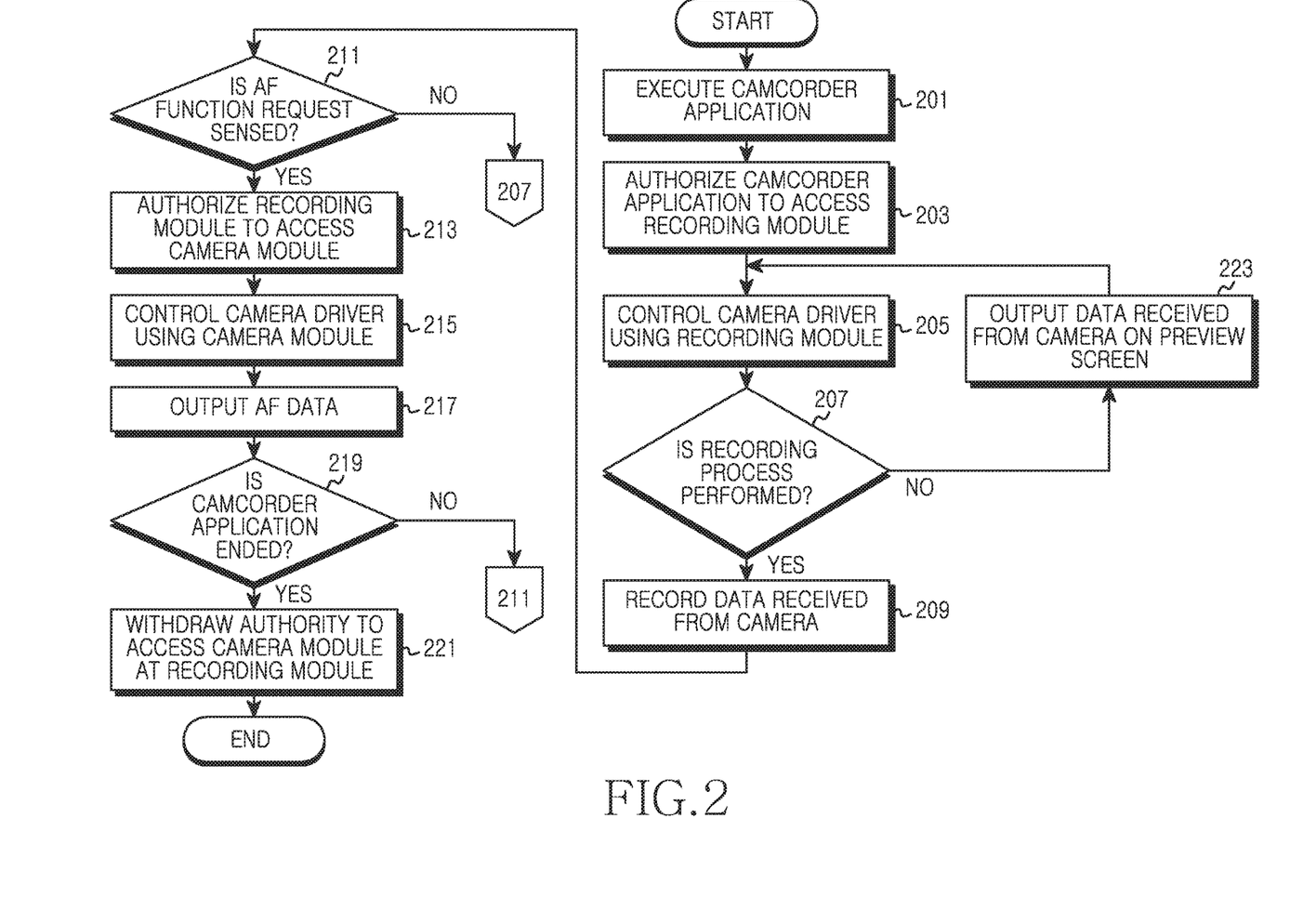
FIG. 2 is a flowchart illustrating a process of performing an Auto Focus (AF) function in an electronic device according to an exemplary embodiment of the present invention.

FIG. 2 is a flowchart illustrating a process of performing an AF function in an electronic device according to an exemplary embodiment of the present invention.

Referring to FIG. 2, the electronic device executes a camcorder application for acquiring a moving picture data using a signal input through an imaging device such as a CCD or a CMOS device in step 201. The electronic device proceeds to step 203 in which the electronic device authorizes the camcorder application to access a recording module. For example, the electronic device authorizes the camcorder application to control an operation of a camera using the recording module and acquire the moving picture data through the controlled camera.

The electronic device proceeds to step 205 in which the electronic device controls a camera driver using the recording module, and controls operations (e.g., lens movement, data input, and the like) of the camera. The electronic device proceeds to step 207 in which the electronic device determines whether a recording process will be performed.

If it is determined that the recording process will not be performed in step 207, the electronic device proceeds to step 223 in which the electronic device outputs a data received from the camera on a preview screen. The electronic device thereafter proceeds to step 205 in which the electronic device determines whether a received data will be recorded while controlling an operation of the camera.

In contrast, if it is determined that the recording process will be performed in step 207, the electronic device proceeds to step 209 in which the electronic device records and stores a data received from the camera. The electronic device proceeds to step 211 in which the electronic device determines whether an AF function request is detected.

In general, a camcorder application of a electronic device according to the related art may control a camera driver through a recording module and may acquire and store a moving picture data. In addition, a camera application of the conventional electronic device controls the camera driver through a camera module, and acquires a still picture or provides an AF function for the still picture. However, because the recording module and the camera module are independently driven, when the camcorder application is executed, a camera function like an AF function may not be performed. Accordingly, the electronic device according to the related art has a problem in that the recording module may not access the camera module when the camcorder application is executed.

In order to solve the above-described problem, the electronic device according to an exemplary embodiment of the present invention may perform the following operation and may perform an AF function during a recording process.

If the AF function request is not detected in step 211, the electronic device proceeds to step 207 in which the electronic device in which the electronic device determines whether a recording process will be performed.

In contrast, if the AF function request is detected in step 211, the electronic device proceeds to step 213 in which the electronic device authorizes the recording module to access a camera module. The electronic device proceeds to step 215 in which the electronic device controls the camera driver using the camera module to control an operation of the camera. Herein, the recording module provides the AF function request to the camera module using a previously defined command. The camera module may control the camera driver using the previously defined command and may acquire a data which is automatically focused. For example, the camera module may control the camera driver, may move a camera lens according to distance of an object, and may focus on the object automatically.

The electronic device proceeds to step 217 in which the electronic device outputs the data which is automatically focused on an output screen. The electronic device proceeds to step 219 in which the electronic device determines whether the camcorder application is ended. The process of step 217 corresponds to a process of providing an acquired data to the recording module at the camera module which acquires the data which is automatically focused and outputting the data on the application while recording the data at the recording module which receives the data.

If it is determined that the camcorder application is not ended in step 219, the electronic device proceeds to step 211 in which the electronic device determines whether an AF function request is detected.

In contrast, if it is determined that the camcorder application is ended in step 219, the electronic device proceeds to step 221 in which the electronic device withdraws the authority to access the camera module at the recording module. Thereafter, the electronic device ends the algorithm of FIG. 2.

For example, if the electronic device according to an exemplary embodiment of the present invention uses an AF function when performing a recording process using the recording module, it authorizes the recording module to access the camera module, acquire a data which is focused through the camera module, and provides the focused data to the recording module.

Figure 3:
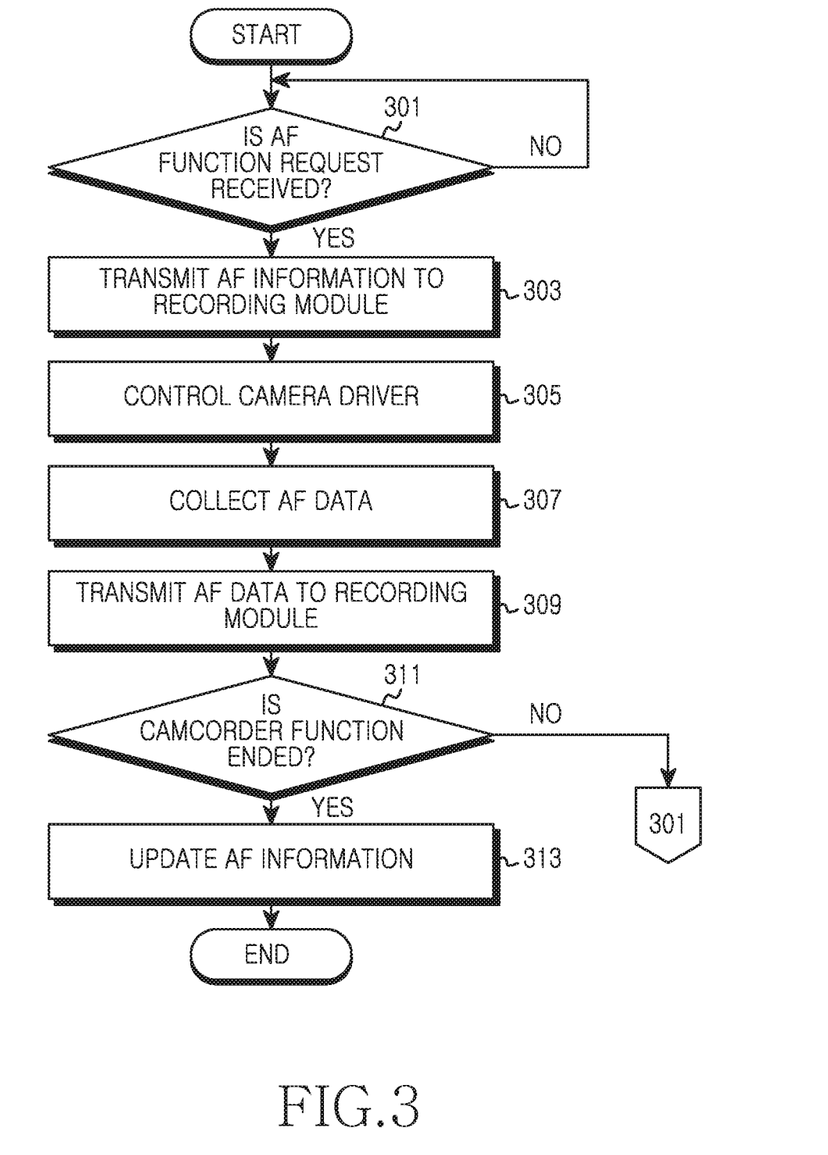
FIG. 3 is a flowchart illustrating a process of providing an AF function at a camera module according to an exemplary embodiment of the present invention.

FIG. 3 is a flowchart illustrating a process of providing an AF function at a camera module according to an exemplary embodiment of the present invention.

Referring to FIG. 3, the camera module corresponds to a module of a software type for controlling a camera driver and providing still pictures and an AF function. Also, the camera module may be implemented as hardware to control a camera driver.

First, the camera module determines whether an AF function request is received in step 301. The AF function request is a request of a user for moving a camera lens according to distance of an object and automatically focusing on the object. The AF function request may be received through a recording module. This is because it is assumed that the camera module is operated by the recording module. When the camera module may communicate with an application, it may receive the AF function request without passing through the recording module.

If the AF function request is not received in step 301, the camera module performs the processing from step 301 again. For example, the camera module continues to poll the electronic device to determine whether an AF function request is received.

In contrast, if the AF function request is received in step 301, the camera module proceeds to step 303 in which the camera module transmits AF information to the recording module. The AF information is information in which an AF state performed at the camera module is recorded. For example, the AF information may be information in which an AF position, AF success/failure information, and the like are recorded. To load the AF information on the recording module is to provide the AF information to the user using previously performed information when the recording module performs an AF function.

The camera module proceeds to 305 in which the camera module controls the camera driver, moves a lens of a camera, and focuses the moved lens of the camera on an object. The camera module proceeds to step 307 in which the camera module collects an AF data. Herein, the AF data means an image data which is focused by an AF function.

The camera module proceeds to step 309 in which the camera module transmits the collected AF data to the recording module in order to record the AF data. The camera module proceeds to step 311 in which the camera module determines whether a camcorder application is ended. The end of the camcorder application means that an operation of the camera module is ended because the camcorder application is ended.

If it is determined that the camcorder application is not ended in step 311, the camera module performs the processing from step 301 again. For example, if it is determined that the camcorder application is not ended in step 311, then the camera module proceeds to step 301 in which determines whether an AF function request is received.

In contrast, if it is determined that the camcorder application is ended in step 311, the camera module proceeds to step 313 and updates AF information. For example, the camera module receives a state of an AF function recorded by the recording module and updates the AF information. For this reason, when an AF function is performed while the camera module is independently driven, the camera module may provide the AF information to the user using information performed by the recording module.

Thereafter, the camera module which updates the AF information ends the algorithm of FIG. 3.

Figure 4:
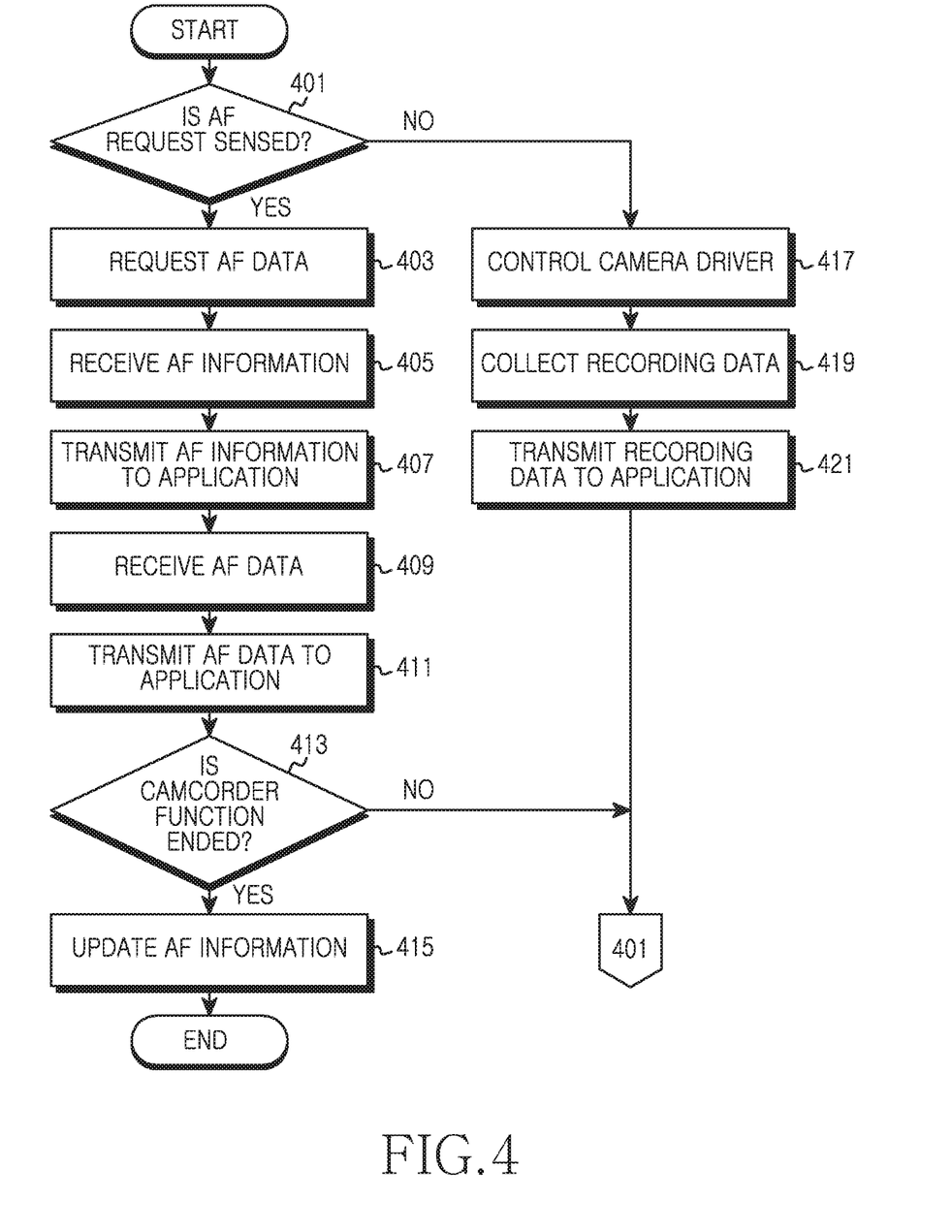
FIG. 4 is a flowchart illustrating a process of providing an AF function at a recording module according to an exemplary embodiment of the present invention.

FIG. 4 is a flowchart illustrating a process of providing an AF function at a recording module according to an exemplary embodiment of the present invention.

Referring to FIG. 4, the recording module corresponds to a module of a software type for controlling a camera driver and for acquiring and storing moving pictures. The recording module may also be implemented as hardware to control the camera driver.

First, the recording module determines whether an AF request is detected in step 401. Herein, the recording module may detect and determine an input (e.g., key input and touch input) of a user, which is generated on a screen output by executing a camcorder application.

If the AF request is not detected in step 401, the recording module performs a process of acquiring a recording data through processes of steps 417 to 421.

For example, the recording module controls the camera driver and controls an operation of a camera lens in step 417. The recording module proceeds to step 419 in which the recording module collects a recording data input through a camera. The recording module proceeds to step 421 in which the recording module transmits the recording data to an application to provide the recording data to a user. At this time, an electronic device may provide a data input through the camera while storing the data in a separate storing space. This means that the user performs a recording process.

In addition, the electronic device may provide a data input through the camera to only the user without storing the data in a separate storing space. This means that the user performs a preview screen output process.

The recording module which acquires the recording data performs the processing from step 401 again. For example, the recording module determines whether an AF request is detected in step 401.

In contrast, if the AF request is detected in step 401, the recording module may perform an AF function while acquiring a recording data through processes of steps 403 to 411.

For example, the recording module proceeds to step 403 in which the recording module requests a camera module to transmit an AF data. Herein, the recording module may ascertain an object automatically and focus on the object automatically by performing the AF function. As another implementation, the recording module may focus on a region selected by the user by performing the AF function. When the recording module focuses on the region selected by the user automatically, it may provide information about the region selected by him or her to the camera module.

The recording module proceeds to step 405 in which the recording module receives AF information from the camera module. The recording module proceeds to step 407 in which the recording module transmits the received AF information to an application. Herein, the AF information is information in which an AF state performed at the camera module is recorded. For example, the AF information may be information in which an AF position, AF success/failure information, and the like are recorded. To receive the AF information at the recording module is to provide the AF information to the user using previously performed information when the recording module performs an AF function. For example, the recording module provides information about a previous AF point to the application to output the information.

The recording module proceeds to step 409 in which the recording module receives an AF data from the camera module. The recording module proceeds to step 411 in which the recording module transmits the AF data to the application. The AF data means an image data which is automatically focused on an object or a region selected by the user.

The recording module proceeds to step 413 in which the recording module determines whether a camcorder application is ended. Herein, the end of the camcorder application means that an operation of the recording module is ended because the camcorder application is ended.

If it is determined that the camcorder application is not ended in step 413, the recording module performs the processing from step 401 again. For example, If it is determined that the camcorder application is not ended in step 413, then the recording module proceeds to step 401 in which the recording module determines whether an AF request is detected.

In contrast, if it is determined that the camcorder application is ended in step 413, the recording module proceeds to step 415 in which the recording module updates AF information. For example, a state of the AF function recorded by the recording module is transmitted to the camera module and the AF information is updated. For this reason, when the recording module performs the AF function while the camera module is independently driven, it may provide the AF function to the user using information performed at it.

Thereafter, the recording module which updates the AF information ends the algorithm of FIG. 4.

Figure 5A:
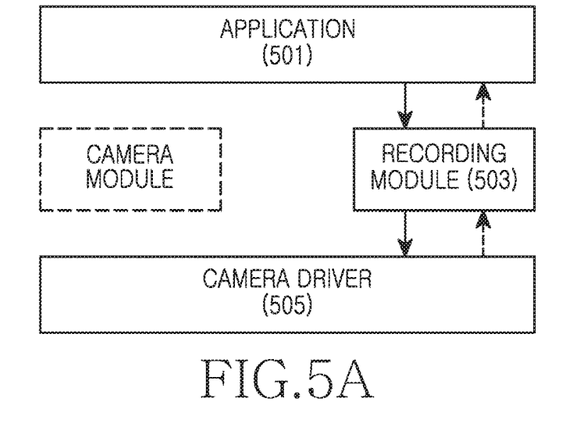
FIG. 5A is a block diagram illustrating a recording process of an electronic device according to an exemplary embodiment of the present invention.
Figure 5B:
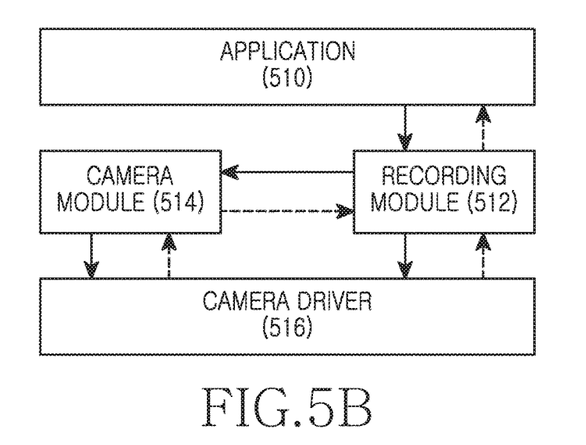
FIG. 5B is a block diagram illustrating an AF recording process of an electronic device according to an exemplary embodiment of the present invention.
Figure 5C:
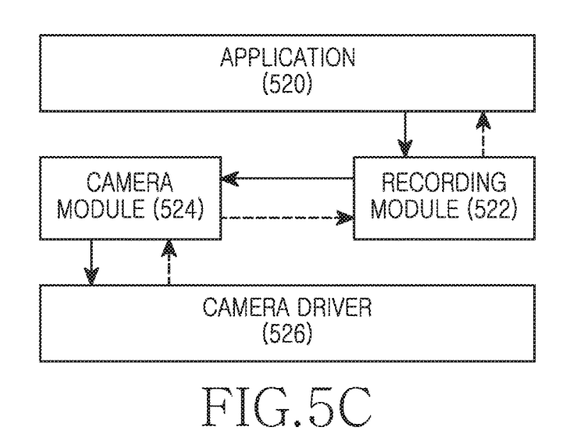
FIG. 5C is a block diagram illustrating an AF recording process of an electronic device according to an embodiment of the present invention.

FIGS. 5A to 5C are block diagrams illustrating an operation process of an AF function of an electronic device according to an exemplary embodiment of the present invention.

Referring to FIGS. 5A to 5C, the electronic device may include an application, a recording module, a camera module, and a camera driver.

First, the application is installed in an application module of the electronic device and corresponds to a program for providing a camera function or a camcorder function.

The recording module is a module for communicating with the application for providing a camcorder function and the camera driver. In general, the recording module controls the camera driver and operates a camera. In addition, the recording module provides an image data input through the camera to the application to output the image data on a screen of the electronic device. The recording module may also record and store an image data input through the camera and provides the stored image data to the application to output the image data on the screen. In addition, the recording module may communicate with the camera module during a recording process, may acquire a data to which an AF function is applied, and may record and store the acquired data.

The camera module is a module for communicating with the application for providing a camera function and the camera driver. In general, the camera module controls the camera driver and operates a camera. In addition, the camera module may move a camera lens according to distance of an object using the camera driver and may focus on the object automatically. In addition, the camera module may provide a data which is focused on the object to the recording module.

The camera driver operates the camera according to control of the camera module or the recording module.

FIG. 5A is a block diagram illustrating a recording process of an electronic device according to an exemplary embodiment of the present invention.

Referring to FIG. 5A, the electronic device uses a recording module 503 when performing a recording process for storing a moving picture data. For example, when an application 501 is executed, the recording module 503 is activated and a plurality of User Interfaces (UIs) are displayed on a screen of the electronic device. When the recording module 503 detects user input on the UI, it controls a camera driver 505 to move a camera lens and acquire a data photographed by a camera. Therefore, the recording module records and stores the data photographed by the camera, or provides the photographed data to the application 501 to output it on a screen of the electronic device.

FIG. 5B is a block diagram illustrating an AF recording process of an electronic device according to an exemplary embodiment of the present invention.

Referring to FIG. 5B, the AF recording process is a process of simultaneously performing a recording process and an AF function. The electronic device, as described above, uses a recording module 512 when performing a recording process for storing moving pictures.

In addition, the electronic device uses a camera module 514 additionally when performing the AF recording process of performing an AF function during a recording process. For example, when the electronic device detects an AF function request on a UI of an application 510 while performing a recording process, the electronic device authorizes the recording module 512 to access the camera module 514. For this reason, the camera module 515 may control a camera driver 516, may perform an AF function, may acquire an AF data, and may transmit the acquired data to the recording module 512.

For example, the electronic device authorizes the recording module 512 to access the camera module 514 while acquiring a moving picture data using the recording module 512 and acquires an AF data from the camera module 514. The electronic device acquires a photographing data through the camera module 514 only when performing an AF function.

FIG. 5C is a block diagram illustrating an AF recording process of an electronic device according to an embodiment of the present invention.

Referring to FIG. 5C, as described above, the electronic device uses a recording module 522 and a camera module 524 when performing a recording process for storing moving pictures.

For example, when the electronic device detects a recording function request on a UI of an application 520, the electronic device authorizes the recording module 522 to access the camera module 524. For this reason, the camera module 524 controls a camera driver 526 under control of the recording module 522, acquires a photographing data, and provides the acquired data to the recording module 522.

In addition, when the recording module 522 detects an AF function request on the UI of the application 520 during a recording process, the recording module 522 provides the detected AF function request to the camera module 524. The camera module 524 which receives the AF function request may control the camera driver 526, may perform an AF function, may acquire an AF data, and may transmit the acquired data to the recording module 522.

For example, the electronic device authorizes the recording module 522 to access the camera module 524 when performing a recording function and acquires a moving picture data and an AF data from the camera module 522. For example, the electronic device acquires a photographing data of an overall recording process through the camera module 524.

Figure 6:
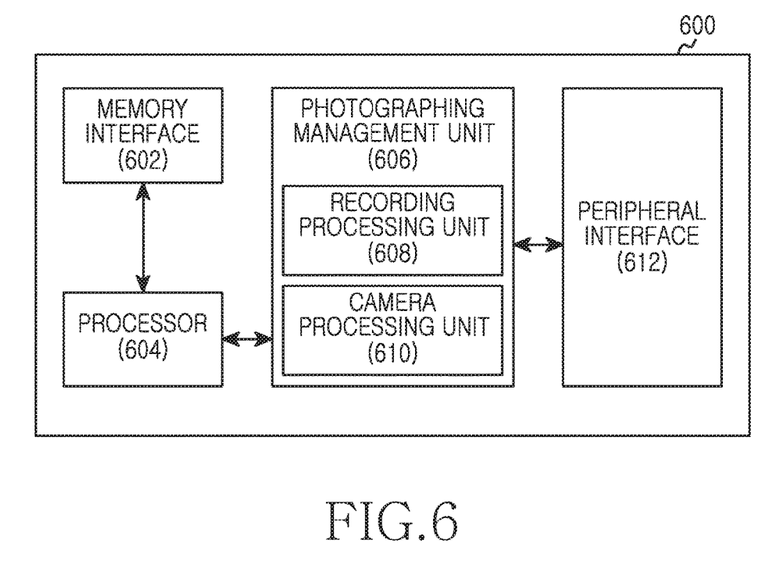
FIG. 6 is a block diagram illustrating detailed configuration of a processor unit of an electronic device according to an exemplary embodiment of the present invention.

FIG. 6 is a block diagram illustrating detailed configuration of a processor unit of an electronic device according to an exemplary embodiment of the present invention.

Referring to FIG. 6, a processor unit 600 of the electronic device is a unit for controlling an overall operation of the electronic device and may be an Application Processor (AP). In addition, FIG. 6 shows the electronic device in which a camera module and a recording module are implemented as a hardware type. The camera module and the recording module implemented as the hardware type are included in the processor unit 600.

The processor unit 600 may include a memory interface 602, a peripheral interface 612, a processor 604, and a photographing management unit 606. The photographing module stored in the memory of FIG. 1 is implemented as hardware. For example, the photographing module stored in the memory of FIG. 1 is implemented in the photographing management unit 606. The photographing management unit 606 may include a recording processing unit 608 and a camera processing unit 610.

The processor 604 interworks with the photographing management unit 606 and software modules stored in the memory of FIG. 1 and performs an exemplary embodiment of the present invention. In accordance with an embodiment of the present invention, the electronic device operates the recording processing unit 608 when performing a recording operation. When it is necessary to perform an AF function during a recording process, the electronic device controls an operation of the camera processing unit 610 using the recording processing unit 608.

Herein, the camera processing unit 610 and the recording processing unit 608 may control a camera driver. The camera processing unit 610 may acquire a photographing data for a still picture and may control an AF function for an object. In addition, the recording processing unit 608 may acquire and store a photographing data for a moving picture. The electronic device may not control an AF function through an independent operation of the recording processing unit 608.

Therefore, when it is necessary to perform an AF function during a recording process, the processor 604 authorizes the recording processing unit 608 to control an operation of the camera processing unit 608.

For this reason, the recording processing unit 608 controls the camera processing unit 610 while performing a recording process and allows the camera processing unit 610 to perform an AF function. The camera processing unit 610 may acquire an AF data and may provide the acquired data to the recording processing unit 608.

It will be appreciated that exemplary embodiments of the present invention according to the claims and description in the specification can be realized in the form of hardware, software or a combination of hardware and software. Any such software may be stored in a non-transient computer readable storage medium. The computer readable storage medium stores one or more programs (software modules), the one or more programs comprising instructions, which when executed by one or more processors in an electronic device, cause the electronic device to perform a method of the present invention. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and exemplary embodiments suitably encompass the same.

As described above, the electronic device according to an exemplary embodiment of the present invention improves performance of a recording function. Also, the electronic device may perform communication between a module for providing a moving picture photographing function and a module for providing a still picture photographing function and an AF function and may perform the AF function during a recording process.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus comprising:
   a camera;
   a communication interface to perform a wireless communication with an external electronic device; and
   a processor configured to:
      record, using the camera, video data with an automatic focus function for the camera inactivated;
      receive, during the recording, a request to activate the automatic focus function; and
      activate, in response to the request, the automatic focus function such that a focus is automatically adjusted with respect to an object in a frame of the video data, while maintaining recording of the video data,
      wherein activating the automatic focus function is performed by a processor different from the processor configured to record.

2. The apparatus of claim 1, wherein the processor is further configured to:
   perform the recording using a recording processor; and
   perform activating or inactivating the automatic focus function using a camera processor different from the recording processor.

3. The apparatus of claim 2, wherein the processor is further configured to:
   enable, in response to the request, the recording processor to acquire focus data for the frame as the automatic focus function is applied via the camera processor.

4. The apparatus of claim 3, wherein the processor is further configured to:
   disable, using the camera processor, acquisition of the focus data via the recording processor, based at least in part on a determination that the recording is stopped or completed.

5. The apparatus of claim 1, further comprising memory, wherein the processor is further configured to store state information corresponding to the automatic focus function with respect to the recording, in the memory.

6. The apparatus of claim 5, wherein the state information comprises:
   first information indicating a position on the frame with respect to which the automatic focus function is applied, and
   second information indicating a success or a failure of the automatic focus function.

7. The apparatus of claim 1, wherein the processor is further configured to:
   determine, based at least in part on state information stored with respect to at least an automatic focus function of the camera activated prior to the recording of the video data with the automatic focus function activated, a position on the frame with respect to which the automatic focus function is applied.

8. The apparatus of claim 1, further comprising an input device to receive the request from a user.

9. The apparatus of claim 8, wherein the input device comprises a touch screen.

10. A method comprising:
    recording, using a camera included in a portable communication device, video data with an automatic focus function for the camera inactivated;
    receiving, using one or more processors of the portable communication device, a request during the recording to activate the automatic focus function; and
    activating the automatic focus function in response to the request such that a focus is automatically adjusted with respect to an object in a frame of the video data, while maintaining the recording of the video data,
    wherein the activating of the automatic focus function is performed by a processor different from a processor configured to record.

11. The method of claim 10, wherein the recording of the video data with the automatic focus function activated comprises:
    recording the video data using a recording processor; and
    activating the automatic focus function using a camera processor different from the recording processor.

12. The method of claim 11, wherein the recording of the video data with the automatic focus function activated comprises:
    enabling, in response to the request, the recording processor to acquire focus data for the frame as the automatic focus function is applied via the camera processor.

13. The method of claim 12, further comprising:
    disabling, using the camera processor, the acquisition of the focus data via the recording processor, based at least in part on a determination that the recording is stopped or completed.

14. The method of claim 10, further comprising:
    storing state information corresponding to the automatic focus function with respect to the recording in the portable communication device.

15. The method of claim 14, wherein the state information comprises:
    first information indicating a position on the frame with respect to which the automatic focus function is applied, and
    second information indicating a success or a failure of the automatic focus function.

16. The method of claim 10, wherein the recording the video data with the automatic focus function activated comprises:
    determining, based at least in part on state information stored with respect to at least an automatic focus function of the camera activated prior to the recording of the video data with the automatic focus function activated, a position on the frame with respect to which the automatic focus function is applied.

17. The method of claim 10, wherein the receiving comprises:
    determining the request based on an input received from a user via a touch screen operatively coupled with the portable communication device.

18. A non-transitory computer readable medium storing instructions that, when executed by one or more processors, causes the one or more processors to perform operations comprising:
    recording, using a camera included in a portable communication device, video data with an automatic focus function for the camera inactivated;
    receiving, during the recording, a request to activate the automatic focus function; and
    activating, in response to the request, the automatic focus function such that a focus is automatically adjusted with respect to an object in a frame of the video data, while maintaining the recording of the video data,
    wherein the activating of the automatic focus function is performed by a processor different from a processor configured to record.

19. The non-transitory computer readable medium of claim 18, wherein the recording of the video data with the automatic focus function activated comprises:

recording the video data using a recording processor; and activating the automatic focus function using a camera processor different from the recording processor.

20. The non-transitory computer readable medium of claim 19, wherein the recording of the video data with the automatic focus function activated comprises:

enabling, in response to the request, the recording processor to acquire focus data for the frame as the automatic focus function is applied via the camera processor.

\* \* \* \* \*